(12) United States Patent
Helt

(10) Patent No.: US 6,282,910 B1
(45) Date of Patent: Sep. 4, 2001

(54) INDOOR BLOWER VARIABLE SPEED DRIVE FOR REDUCED AIRFLOW

(75) Inventor: Robert W. Helt, Tyler, TX (US)

(73) Assignee: American Standard International Inc., New York, NY (US)

( * ) Notice: Subject to any disclaimer, the term of this patent is extended or adjusted under 35 U.S.C. 154(b) by 0 days.

(21) Appl. No.: 09/598,505

(22) Filed: Jun. 21, 2000

(51) Int. Cl.$^7$ .................................................. F25B 1/00
(52) U.S. Cl. .......................................................... 62/229
(58) Field of Search ................................. 62/229, 228.1, 62/190, 132; 236/49.3, 49.2, 49.1; 318/807

(56) References Cited

U.S. PATENT DOCUMENTS

| | | | |
|---|---|---|---|
| 3,723,848 | * 3/1973 | Miller | 363/133 |
| 3,875,483 | * 4/1975 | Farr | 318/807 |
| 4,259,845 | * 4/1981 | Norbeck | 62/209 |
| 4,566,289 | 1/1986 | Iizuka et al. | |
| 4,901,537 | * 2/1990 | Yoshikawa et al. | 62/235.1 |
| 5,078,318 | 1/1992 | Kawai et al. | |
| 5,197,667 | 3/1993 | Bowsky et al. | |
| 5,252,905 | 10/1993 | Wills et al. | |
| 5,303,561 | 4/1994 | Bahel et al. | |
| 5,492,273 | 2/1996 | Shah | |
| 5,555,737 | * 9/1996 | Takeo et al. | 62/230 |
| 5,613,370 | * 3/1997 | Pichotta | 62/228.1 |
| 5,689,141 | * 11/1997 | Kikkawa et al. | 290/52 |
| 5,768,903 | * 6/1998 | Sekigami et al. | 62/196.2 |
| 5,857,349 | * 1/1999 | Hamaoka et al. | 62/228.4 |
| 6,041,608 | * 3/2000 | Fujiwara | 62/229 |
| 6,118,239 | * 9/2000 | Kadah | 318/268 |

* cited by examiner

Primary Examiner—Teresa Walberg
Assistant Examiner—Daniel Robinson
(74) Attorney, Agent, or Firm—William J. Beres; William O'Driscoll; Peter D. Ferguson

(57) ABSTRACT

An air-handler includes an AC induction motor that drives a blower to move air across a heat exchanger. A switch system selectively determines whether the blower motor operates at its rated full speed or at a reduced speed. For full speed operation, the switch system couples an AC supply at a nominal line frequency directly to the blower motor and bypasses an inverter. For reduced speed operation, the switch system couples a lower frequency output of the inverter to the blower motor. The blower is operated at a reduced speed during a pre-run dehumidification mode, a post-run heat recovery mode, and/or an electronic air-cleaning mode. The switch system allows the rated current capacity of the inverter to be substantially less that the rated full load current of the blower motor.

20 Claims, 2 Drawing Sheets

INDOOR BLOWER VARIABLE SPEED DRIVE FOR REDUCED AIRFLOW

BACKGROUND OF THE INVENTION

1. Field of the Invention

The present invention relates to air conditioning and heating systems. More particularly, the present invention relates to air conditioning and heating systems in which a blower is used to circulate air within a building.

2. Description of Related Art

Air conditioning systems typically include an air-handler that provides conditioned air to a comfort zone, such as a room or a designated area within a building. The conditioning of the air may include, but not be limited to heating, cooling, humidifying, dehumidifying, filtering, ventilating, and their various combinations. Air-handlers can also assume a variety of configurations to best serve their intended purpose.

One basic air-handler, for example, may simply include a furnace for providing heat to the comfort zone. Other residential air-handlers, known as split systems, may include separate indoor and outdoor units, with each unit having its own heat exchanger and blower. Split systems usually provide cooling and/or heating. Other systems, such as packaged or self-contained units (e.g., conventional window-mounted air conditioners) and larger, commercial air-handlers may also provide cooling and/or heating, but combine the indoor and outdoor units within a single enclosure.

Air-handlers typically include, or are associated with, one or more fans or blowers that move the air through a network of supply and return air ducts. Supply air ducts deliver the conditioned air to the rooms. Return air ducts convey the used or return air back to the air-handler for reconditioning before the supply air ducts convey the air back to the rooms.

To help keep an air-handling system clean, an air filter is usually placed in the return air duct to remove dirt and dust from the air. Such filters are often disposable cardboard or paper-type filters that are discarded when dirty.

In many cases, an electronic air cleaner is installed in the return air duct to clean the air more thoroughly. An electronic air cleaner electrostatically charges dust and other small particles in the air that passes through the cleaner. An oppositely charged collection plate in the cleaner then attracts the particles and removes them from the air stream. In order for an electronic air cleaner to be effective, air must pass through it. Thus, when an air-handler's supply air blower turns off upon satisfying the comfort zone's demand for conditioned air, the air cleaner's operation also stops. Alternatively, the blower could be kept running at its normal speed; however, that would be quite wasteful of electrical energy, as the rate of airflow for heating or cooling the air is generally much greater than that what is needed to just clean the air.

Another option would be to keep the blower running, but at a reduced speed. This could be done by simply using an inverter-driven AC induction motor to power the blower, as disclosed in U.S. Pat. No. 5,078,318. However, the cost of AC inverters increases dramatically with its current carrying capacity. Moreover, the power to operate a blower increases generally with the cube of its delivered airflow rate. Thus, the current draw of the blower motor also increases exponentially with motor speed. As a result, providing an expensive, full-sized inverter to power a blower motor at its rated speed is impractical when the inverter is only needed for providing perhaps half that speed for a current draw conceivably as low as one-eighth of the motor's rated full load current.

Still further, whereas older heating and air conditioning systems often employ a single speed indoor blower operating in conjunction with an air conditioner and/or furnace operating on a simple on-off, single-stage basis, certain newer air conditioners and furnaces employ multispeed compressors (in the case of air conditioners) and staged burners (in the case of furnaces) which are capable of operating at less than full capacity so as to save energy when outdoor conditions permit.

Thus, additional energy and cost savings can potentially be achieved by controlling the speed of the indoor blower motor in accordance with the actual demand for airflow circulation within the building rather than on a simple on-off basis.

The need therefore exists for apparatus and a methodology, in new and retrofit HVAC applications, for operating an indoor blower associated with a heating and/or air conditioning system at a speed which circulates air within a building at a rate that is commensurate with demand under the then-existing conditions.

SUMMARY OF THE INVENTION

To provide an inverter-driven blower motor operable at the motor's full rated speed and at slower speeds, it is an object of the invention to employ a switch system that allows the use of an inverter whose current capacity rating is less than the motor's full load current rating.

Another object is to provide an inverter-driven compressor motor operable at the motor's full rated speed and at slower speeds by employing a switch system that allows the use of an inverter whose current capacity rating is less than the motor's full load current rating.

Another object of the invention is to provide a low-cost method of retrofitting an existing air-handler having a constant speed blower to one having a variable speed blower.

Yet another object is to provide an air-handler whose electronic air cleaner continues to operate even after a refrigerant compressor associated with the air-handler turns off.

A further object of the invention is to improve an electronic air cleaner's effectiveness of cleaning air by reducing the speed at which the airflow passes through the cleaner.

A still further object is to provide a refrigerant system that uses an inverter to reduce the speed of a supply air blower when the system's refrigerant compressor is operating at a reduced capacity, and bypasses the inverter to run the supply air blower at full speed when the compressor is operating at full capacity.

Another object is to provide a refrigerant system that just prior to a full cooling mode includes a pre-run dehumidification mode, wherein an inverter drives a supply air blower or an outdoor air blower at a reduced speed while the system's refrigerant compressor is operating at a reduced capacity.

Another object is to provide a heating and/or cooling system with a post-run heat recovery mode, wherein an inverter drives a supply air blower at a reduced speed to recover residual heat energy (hot or cold) from the system's heat exchanger after the system's refrigeration compressor turns off.

These and other objects of the invention are provided by an air-handler that includes an AC induction motor that drives an indoor or outdoor blower to move air across a heat exchanger. A switch system selectively determines whether the blower motor operates at full speed or at a reduced speed.

For full speed operation, the switch system couples an AC supply to the blower motor and bypasses an inverter. For reduced speed operation, the switch system couples the inverter to the blower motor to reduce its speed during a pre-run dehumidification mode, a post-run heat recovery mode, or an air-cleaning mode.

DESCRIPTION OF THE PREFERRED EMBODIMENT

Figure 1:
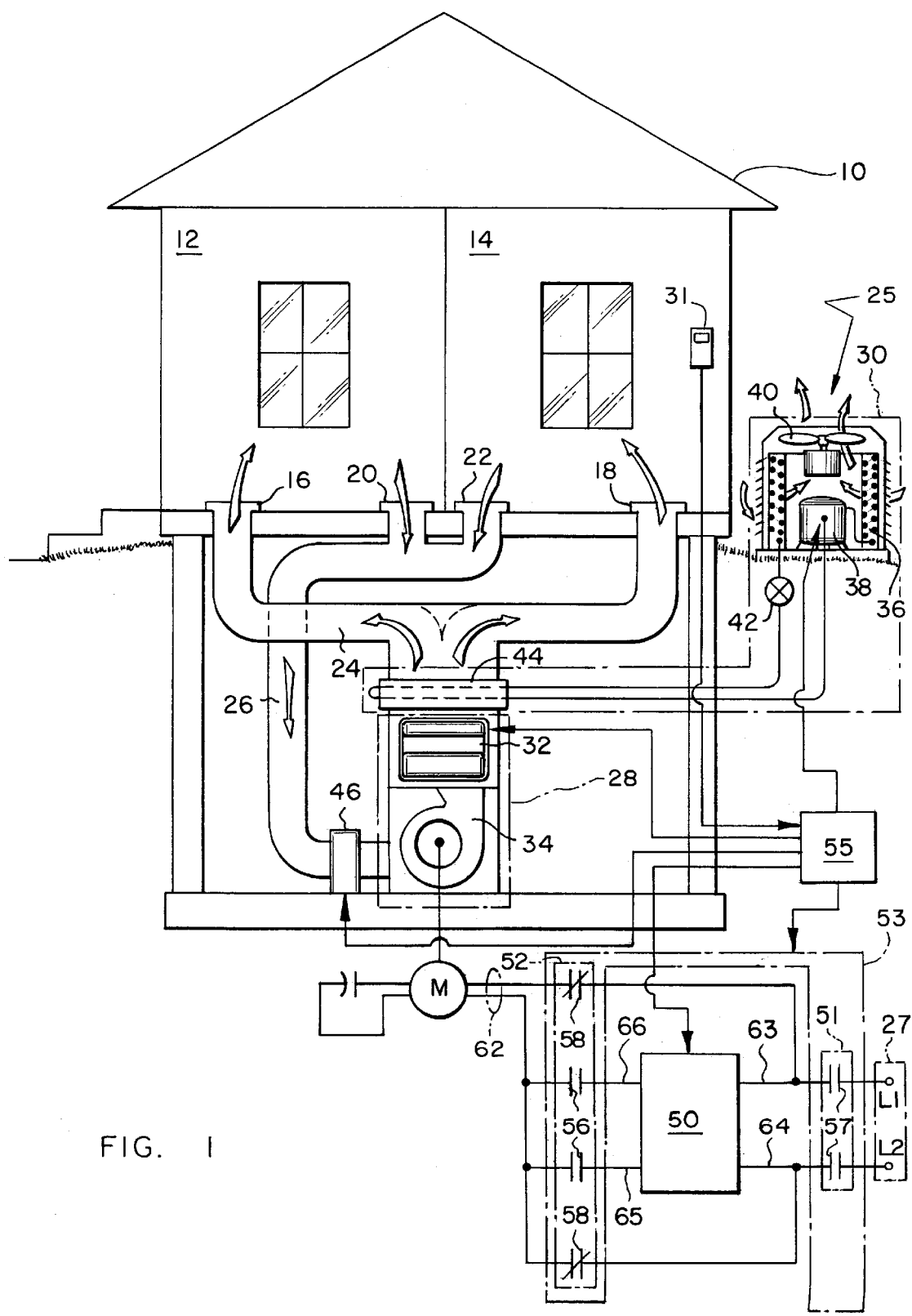
FIG. 1 is a schematic illustration of an air-handler according to one embodiment of the invention.

Referring to FIG. 1, a building 10 is illustrated which has first and second rooms 12 and 14. As is illustrated, each of rooms 12 and 14 respectively have a supply register 16 and 18 as well as a return air register 20 and 22. Supply air registers 16 and 18 are connected to supply duct 24 while return air registers 20 and 22 are connected to return air duct 26.

In the illustrated embodiment, building 10 has an air-handler 25 that includes a furnace 28 and an air conditioning unit 30. While air conditioning unit 30 can be of the cooling only or heat pump type, it will be described for simplicity in terms of a cooling only unit. Furnace 28, in the illustrated embodiment, is a typical furnace of the type which will most often be fired by gas. Such units will heat and/or cool this building's air so that its temperature matches the temperature set by the building occupants on thermostat 31.

Furnace 28 has a heat exchanger 32 which, when furnace 28 is operating, will be heated, such as by the combustion of gas or oil. Alternatively, heat exchanger 32 might be heated electrically or by another source of energy. An indoor blower 34 draws return air out of rooms 12 and 14 through return air duct 26. Blower 34 then forces the air across heat exchanger 32, which heats the air when furnace 28 is on. The heated supply air is then delivered into supply air duct 24, which conveys the air to rooms 12 and 14.

Air conditioner 30 includes a refrigerant compressor 38, an outdoor heat exchanger coil 36, a fan 40 and a metering device 42. When air conditioner 30 is in operation, compressor 38 compresses refrigerant gas and discharges it to outdoor heat exchanger coil 36. Fan 40 directs outdoor ambient air across coil 36 to cool and condense the warmer refrigerant gas flowing through coil 36.

The now cooled refrigerant is metered and thus further cooled by the process of expansion by passing through metering device 42. The refrigerant then travels to indoor heat exchanger coil 44. When thermostat 31 calls for cooling the air within building 10, furnace 28 will, of course, not operate to heat indoor heat exchanger 32. Indoor blower motor 34 will, however, be energized to draw air from rooms 12 and 14 and blow it across indoor coil 44. This cools the relatively warm indoor return air in a heat exchange process with the relatively cooler refrigerant flowing through indoor coil 44.

Air conditioner 30 can, as has been indicated, be a cooling only unit or a heat pump capable of both heating and cooling indoor air. In the case of a heat pump, the operational principles of which are well known, air passing across indoor coil 44 would be heated in the heating season and cooled in the cooling season. In the heating season a heat pump can provide all of the heat needed when outdoor conditions are mild and can supplement furnace heating when conditions are more harsh.

Often in installations where the air conditioning unit has been added to an existing furnace system or where the existing furnace/air conditioner system is older, indoor blower 34 is driven by a single speed, AC induction motor designed to operate at its rated full speed. The rated full speed is relatively high to circulate air at a sufficiently high rate to achieve and maintain the selected room temperature under the severest of outdoor temperature conditions. Because the power consumed by the blower's motor generally follows the cubed function of airflow delivered, it will be appreciated that operating at such a high speed when often only a fraction of the airflow is required is extremely inefficient, costly and wasteful of energy.

Further, in recent years electronic air cleaners 46 have come to be installed in buildings on a much more frequent basis where a disposable cardboard or paper filter might previously have been used. Such cleaners are typically installed in a building's return air ductwork. In order for such electronic air cleaners to maintain a building's air clean, even if the building's heating or air conditioning system is not operating to temperature condition that air, the building's air must be drawn through the air cleaner and be returned to the rooms within the building. However, the rate of airflow required to clean the air is dramatically less than what is often required for heating or cooling. When an electronic air cleaner is added to an existing air-handler having a single speed supply air blower, the air cleaning process stops whenever the supply air blower stops. If the blower is kept running at full speed just to keep the air cleaner operating even though the heating or cooling demand has been satisfied, a very significant amount of energy is wasted in maintaining an airflow rate that is much greater than necessary.

Additionally, certain retrofit air conditioning systems may employ compressors capable of dual, multiple or variable speed operation. Such compressors operate at a first, lower capacity when cooling is called for but ambient conditions are relatively mild and at a second, higher capacity when ambient conditions are more extreme and additional compressor capacity is required. When ambient conditions are relatively mild, the amount of air needed to be circulated throughout a building to achieve occupant comfort will be less than is the case when ambient conditions are more extreme and the rooms in a building are subject to a greater heat load.

If such an air conditioner is retrofit to a building having a single speed indoor blower, energy will be wasted when the indoor blower circulates air at its relatively high design rate during mild ambient conditions. Often under such conditions, the circulation of indoor air can be at a lower rate and still achieve occupant comfort.

In the present invention, an AC induction motor 48 of indoor blower 34, which may be an existing blower originally designed for single speed operation or a blower in a new unit, is capable of being driven at its full, design speed when conditions call for maximum airflow circulation within building 10. However, by reducing the frequency of the motor's supply voltage, blower 34 is also capable of being driven at lower and variable speeds when the rate at which air must be circulated within building 10 is reduced. When outdoor temperature conditions warrant, motor 48 is driven at full speed off of line voltage through motor power leads L1 and L2 of an AC supply 27 to maximize airflow circulation through building 10.

There are several circumstances where reduced airflow circulation within building 10 is acceptable or preferred. For example, reduced airflow can be used in conjunction with a compressor operating at a reduced capacity when the outdoor temperature conditions are relatively mild. Reduced airflow can also be used in a pre-cooling mode where the refrigerant compressor is operated at a reduced capacity for reducing the humidity just prior to a full cooling cycle. Reduced airflow can also be used in a post-cooling or post-heating mode to recover residual heat in heat exchangers 32 or 34 right after the full cooling or full heating cycle stops. Operating air cleaner 46 between cooling or heating cycles is another example of where it is desirable to have blower 34 provide a reduced rate of airflow.

When electronic air cleaner 46 is activated without heating or cooling and requires airflow therethrough at a relatively low rate, motor 48 is driven through inverter 50 to deliver approximately one-half or less airflow than would be the case if motor 48 were driven at full speed. Since motor 48 is inverter driven under these circumstances, it can be driven at a reduced speed that results in an airflow circulation rate that matches the need for airflow under the then-existing circumstance. In that regard, the airflow delivery rate might be set at one particular rate where blower operation is called for to support the air cleaning function only and another or additional rates when staged cooling or heating is called for, alone or in conjunction with air cleaning. Further, the airflow rate might be higher when cooling or heating is initially called for and be decreased as the building's indoor temperature more closely approaches the target temperature set by the building's occupants on thermostat 31.

To determine the speed of blower motor 48, a switch system 53 selectively couples supply 27 to motor 48 through inverter 50 to achieve lower speeds, or couples supply 27 directly to motor 48 and bypasses inverter 50 for full-speed operation. Although switch system 53 can assume a variety of forms, in one embodiment, switch system 53 includes one electromechanical relay 51 having two normally open set of contacts 57 and another electromechanical relay 52 having two normally closed set of contacts 56 and two normally open set of contacts 58.

When temperature conditions within building 10 require maximum air circulation in order for the set point air temperature to be achieved or maintained, relay 51 closes contacts 57, while relay 52 is not actuated to leave contacts 56 open and contacts 58 closed. This connects the full line voltage and nominal frequency (e.g., 60 Hz) of supply 27 to an input 62 of motor 48 for running motor 48 at its rated maximum speed (i.e., a full blower speed mode).

When temperature conditions are such that compressor 38 need only operate at reduced capacity or furnace 28 need be fired at a reduced rate or when the building's temperature approaches its setpoint temperature after an initial cool down or heat up period requiring higher or maximum airflow or when air circulation within building 10 is required only for the purpose of cleaning the building's air by circulation through the air cleaner 46, relays 51 and 52 are energized. This closes contacts 57 and 56 and opens contacts 58. Power at a nominal frequency from supply 27 is applied to inputs 63 and 64 of inverter 50. Inverter 50 then converts that power to create an output of a lower than nominal frequency at inverter outputs 65 and 66, which closed contacts 56 now conveys to motor input 62. The lower frequency causes blower motor 48 to run at a reduced blower speed mode to provide lower airflow rates when appropriate.

Figure 2:
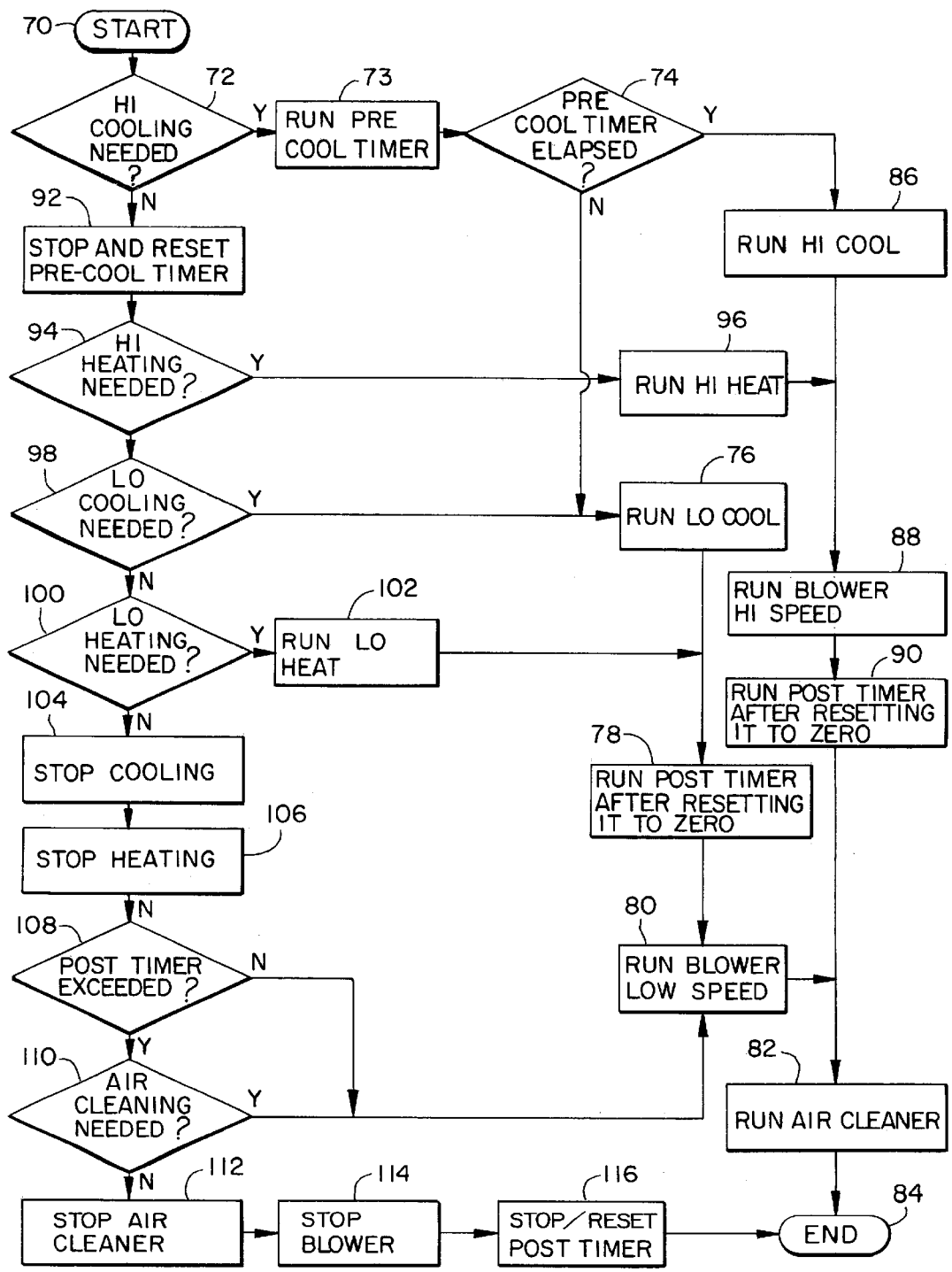
FIG. 2 is a control algorithm illustrating a method of varying the speed of a fan or blower motor.

A control 55 controls the overall operation of air-handler 25 according to the algorithm of FIG. 2. Control 55 and its algorithm serve as just one example of how the control of air-handler 25 can be carried out. The actual structure of control 55 can be provided by any of a variety of well-known control circuits including, but not limited to, computers, programmable logic controllers, electromechanical relays, temperature switches, circuits of solid-state devices, circuits of discrete electronic components, and various combinations thereof.

For this particular example, control begins at block 70. From there, logic block 72 with reference to thermostat 31 determines whether there is a need for high cooling. If so, control block 73 continues running a pre-cool timer or initiates the timer if it was not already running. Logic block 74 determines whether the pre-cool timer has elapsed. The elapsed time can be predetermined fixed period or can be a period that varies as a function of humidity or some other thermodynamic condition of the air. If the pre-cool period has not elapsed, block 76 runs compressor 38 at a reduced capacity to provide a low cooling or dehumidification mode. In such a mode, block 78 resets a post-run timer to zero then allows it to run from there; block 80 energizes relays 51 and 52, which allows inverter 50 to drive blower motor 48 at a reduced speed for reduced airflow; and block 82 turns on air cleaner 46. End block 84 returns the control to blocks 70 and 72.

The pre-cool dehumidification mode may continue until the pre-cool timer elapses, at which time control blocks. 86 and 88 initiate full capacity cooling. Block 86 runs compressor 38 at full capacity and logic block 88 de-energizes relay 52. De-energizing relay 52 opens contacts 56 and closes contacts 58, so the full line voltage and frequency of supply 27 is applied to input 62 of blower motor 48, thereby operating blower motor 48 at its maximum full rated speed. Block 90 is the same as block 78 and pertains to post-heating and post-cooling, which will be explained in more detail later.

If logic block 72 determines that high cooling is not needed, block 92 stops and resets the pre-cool timer to zero. Logic block then determines whether a high heating demand exists. If so, block 96 initiates full-capacity heating by operating furnace 28 at full capacity, by operating unit 30 as a heat pump at full capacity, and/or by initiating some other type of heater. In the full-capacity heating mode, block 88 runs blower 34 at full speed and block 82 keeps air cleaner 46 operating. The full-capacity heating mode continues until conditions change.

If neither high cooling nor high heating are needed, logic block 98 determines whether a low cooling need exists. If so, blocks 76, 78, 80 and 82 provide a low cooling capacity mode. Such a mode is similar to the pre-cooling or dehumidification mode; however, air-handler 25 is preferably controlled in response to a cooling demand rather than a predetermined time. If there is a need for a low heating mode, logic block 100 directs control to block 102, which turns on reduced-capacity heating. This can be done by operating furnace 28 at partial capacity (e.g., fewer burners); by operating unit 30 as a heat pump at a reduced capacity (e.g., reduced compressor speed); and/or by initiating some other type of heater, such as an electric heater.

If neither cooling nor heating is required, then normal cooling and heating modes are stopped by control blocks 104 and 106 respectively. However, if logic block 108 determines that a heating or cooling mode has just stopped as evidenced by the value of the post-run timer of blocks 78 and 90, then block 80 will continue to operate blower 34 at a reduced speed to recover any residual heat that may still be in heat exchangers 32 or 44. Thus, block 108 provides a post-heating mode or a post-cooling mode until the post-run timer expires after some predetermined period.

Logic block 110 determines whether there is a current need to operate electronic air cleaner 46 when neither heating nor cooling is required. Block 110 may be associated with some sort of sensor for detecting the presence of dust in the air, or may simply be tied to a manual input, such as an on/off switch. If air cleaning is desired, block 80 turns blower 34 on at a reduced speed and block 82 turns air cleaner 46 on. If air cleaning is not needed, control block 112 stops air cleaner 46, block 114 stops blower 34 by opening contacts 57, and block 116 stops and reset the post-run timer to zero. End block 84 then returns control back to start block 70 to repeat the logic sequence.

Consequently, inverter 50 controls the speed of motor 48 so that the amount of air circulated through building 10 is sufficient to accommodate the air cleaning process and/or the cooling or heating of the building under conditions where compressor 38 operates at full or reduced capacity or where furnace 28 is fired at its highest or a reduced rate. By operating motor 48 at reduced speeds to match a building's airflow needs at any given time, very significant energy savings are achieved with respect to the power consumed by indoor blower motor 48 because, as has been noted, the power drawn by indoor blower motor 48 follows the cubed function of the airflow delivered by indoor blower 34. As has also been noted, the present invention is applicable to both new systems and to the retrofit of older systems with equipment that can function for its purpose at reduced airflow rates.

Although the invention is described with reference to a preferred embodiment, it should be appreciated by those skilled in the art that other variations are well within the scope of the invention. For example, rather than using relay 51, inverter 50 itself can de-energize inputs 62 to stop blower 34, thus eliminating the need for relay 51. Therefore, the scope of the invention is to be determined by reference to the claims, which follow.

I claim:

1. An air handler for an air conditioning system coupleable to an AC supply of a nominal frequency, comprising:
   a heat exchanger;
   a blower adapted to move air across said heat exchanger;
   an inverter having an inverter input and an inverter output, with said inverter input being coupleable to said AC supply and said inverter output providing a reduced frequency that is lower than said nominal frequency;
   an AC induction motor coupled to said blower and having a motor input, said AC induction motor having a speed that varies with a voltage frequency at said motor input; and
   a switch system coupled to said inverter, said motor input, and said AC supply to selectively couple said motor input to said inverter output and said AC supply, said switch system having a full blower speed mode and a reduced blower speed mode, wherein said AC supply passes through said inverter to drive said AC induction motor when said switch system is in said reduced blower speed mode and said AC supply bypasses said inverter to drive said AC induction motor when said switch system is in said full blower speed mode.

2. The air handler of claim 1, wherein said inverter has a current capacity rating and said AC induction motor has a full load current rating, with said current capacity rating of said inverter being less than said full load current rating of said AC induction motor.

3. The air handler of claim 1, wherein said switch system is an electromechanical relay.

4. The air handler of claim 1, further comprising an electronic air cleaner in series-flow relationship with said blower and said heat exchanger.

5. The air handler of claim 4, further comprising:
   a refrigerant compressor associated with said heat exchanger; and
   a thermostat that selectively turns said refrigerant compressor on and off, wherein said switch system is in said reduced blower speed mode to operate said electronic air cleaner at a reduced airflow rate when said refrigerant compressor is turned off.

6. The air handler of claim 1, further comprising:
   a refrigerant compressor associated with said heat exchanger;
   a thermostat that selectively turns said refrigerant compressor on and off; and
   a time delay associated with said switch system and being initiated upon said thermostat turning said compressor off, wherein said switch system is in said reduced blower speed mode during said time delay, whereby said blower runs at a reduced blower speed after said refrigerant compressor turns off to reclaim residual heat of said heat exchanger.

7. The air handler of claim 6, wherein the duration of said time delay is a function of a temperature.

8. The air handler of claim 1, further comprising a refrigerant compressor associated with said heat exchanger and being operable at a full compressor capacity when said switch system is in said full blower speed mode, and being operable at a lower compressor capacity when said switch system is in said reduced blower speed mode, whereby said full compressor capacity and said full blower speed mode provide said air handler with a full capacity mode, and said lower compressor capacity and said reduced blower speed mode provide said air handler with a dehumidification mode.

9. The air handler of claim 8, further comprising a thermostat that selectively turns said refrigerant compressor on and off; and a time delay associated with said thermostat, said refrigerant compressor, and said switch system, such that said air handler operates in said dehumidification mode during said time delay, and subsequently operates in said full capacity mode upon said time delay expiring.

10. The air handler of claim 9, wherein the duration of said time delay is a function of at least one of temperature and humidity.

11. An air handler for an air conditioning system coupled to an AC supply of a nominal frequency, comprising:
    a heat exchanger;
    a blower adapted to move air across said heat exchanger;
    an electronic air cleaner in series-flow relationship with said blower and said heat exchanger;
    a refrigeration compressor associated with said heat exchanger;
    an inverter having an inverter input and an inverter output, with said inverter input being coupleable to said AC supply and said inverter output providing a reduced frequency that is lower than said nominal frequency;
    an AC induction motor coupled to said blower and having a motor input, said AC induction motor having a speed that varies with a voltage frequency at said motor input;
    a switch system coupled to said inverter, said motor input, and said AC supply to selectively couple said motor input to said inverter output and said AC supply, said switch system having a full blower speed mode and a reduced blower speed mode, wherein said AC supply passes through said inverter to drive said AC induction motor when said switch system is in said reduced blower speed mode and said AC supply bypasses said inverter to drive said AC induction motor when said switch system is in said full blower speed mode; and a thermostat that selectively turns said refrigerant compressor on and off, wherein said switch system is in said reduced blower speed mode to operate said electronic air cleaner at a reduced airflow rate when said refrigeration compressor is turned off.

12. The air handler of claim 11, wherein said inverter has a rated current capacity and said AC induction motor has a rated full load current, with said rated current capacity of said inverter being less than said rated full load current of said AC induction motor.

13. The air handler of claim 11, further comprising a time delay associated with said switch system and being initiated upon said thermostat turning said compressor off, wherein said switch system is in said reduced blower speed mode during said time delay, whereby said blower runs at a reduced blower speed after said refrigerant compressor turns off to reclaim residual heat of said heat exchanger.

14. The air handler of claim 11, wherein said refrigerant compressor is operable at a full compressor speed when said switch system is in said full blower speed mode, and is operable at a lower compressor speed when said switch system is in said reduced blower speed mode, whereby said full compressor speed and said full blower speed mode provide said air handler with a full capacity mode, and said lower compressor speed and said reduced blower speed mode provide said air handler with a dehumidification mode.

15. The air handler of claim 14, further comprising a time delay associated with said thermostat, said refrigerant compressor, and said switch system, such that said air handler operates in said dehumidification mode during said time delay, and subsequently operates in said full capacity mode upon said time delay expiring.

16. An air handler for an air conditioning system coupled to an AC supply of a nominal frequency, comprising:

a heat exchanger;

a blower adapted to move air across said heat exchanger;

a compressor associated with said heat exchanger;

an AC induction motor mechanically coupled to at least one of said blower and said compressor, said AC induction motor including a motor input and having a full load current rating;

an inverter having an inverter input, an inverter output, and a current capacity rating that is less than said full load current rating of said AC induction motor, said inverter input being electrically coupleable to said AC supply, and said inverter output providing a reduced frequency that is lower than said nominal frequency; and a switch system electrically coupled to said inverter, said motor input, and said AC supply to selectively couple said motor input to said inverter output and said AC supply, said switch system having a full speed mode and a reduced speed mode, wherein said AC supply passes through said inverter to drive said AC induction motor when said switch system is in said reduced speed mode and said AC supply bypasses said inverter to drive said AC induction motor when said switch system is at said full speed mode, whereby said AC induction motor can be operated near said full load current rating without exceeding said current capacity rating of said inverter.

17. The air handler of claim 16, further comprising an electronic air cleaner in series-flow relationship with said blower and said heat exchanger.

18. A method of using an inverter and a primary AC supply of a nominal frequency to vary the speed of an AC induction motor that drives a blower, wherein the blower is associated with an air handler of an air conditioning system that includes a refrigerant compressor that turns on and off, comprising:

periodically feeding said primary AC supply through said inverter to create a secondary AC supply of a frequency that is lower than said nominal frequency and feeding said secondary AC supply to said AC induction motor to drive said blower at a reduced blower speed while said refrigerant compressor is turned off; and periodically feeding said primary AC supply to said AC induction motor by bypassing said inverter to drive said blower at a full blower speed while said refrigerant compressor is turned on.

19. The method of claim 18, further comprising periodically driving said AC induction motor at said full blower speed with a current that exceeds a current capacity rating of said inverter.

20. The method of claim 18, further comprising:

selectively operating said refrigerant compressor at a full compressor capacity and a reduced compressor capacity; and periodically feeding said secondary AC supply to said AC induction motor to drive said blower at said reduced blower speed while said refrigerant compressor is turned on and operating at said reduced compressor capacity.

* * * * *